(12) United States Patent
Myers et al.

(10) Patent No.: US 8,057,215 B2
(45) Date of Patent: Nov. 15, 2011

(54) DEVICE FOR PREPARING PIPE ENDS FOR JOINTING

(75) Inventors: Paul Nicholas Myers, West Yorkshire (GB); Steven Garfield Farrar, West Yorkshire (GB); Gordon Leslie Lilley, West Yorkshire (GB)

(73) Assignee: Caldervale Technology Limited, Dewsbury, West Yorkshire (GB)

( * ) Notice: Subject to any disclaimer, the term of this patent is extended or adjusted under 35 U.S.C. 154(b) by 53 days.

(21) Appl. No.: 12/299,344

(22) PCT Filed: May 1, 2007

(86) PCT No.: PCT/GB2007/001582
§ 371 (c)(1),
(2), (4) Date: Jun. 12, 2009

(87) PCT Pub. No.: WO2007/129035
PCT Pub. Date: Nov. 15, 2007

(65) Prior Publication Data
US 2009/0285925 A1    Nov. 19, 2009

(30) Foreign Application Priority Data
May 4, 2006  (GB) .................................. 0608775.3

(51) Int. Cl.
*B29C 57/04*  (2006.01)
(52) U.S. Cl. ........ 425/392; 425/393; 425/466; 425/468; 72/392

(58) Field of Classification Search .......... 425/392–393, 425/466–468, DIG. 218; 72/392–393
See application file for complete search history.

(56) References Cited

U.S. PATENT DOCUMENTS

| 2,266,795 | A |   | 12/1941 | Parker |
| 3,170,236 | A |   | 2/1965 | Massingill |
| 3,412,592 | A |   | 11/1968 | Ramsay |
| 3,857,666 | A | * | 12/1974 | Barnett ........................ 425/393 |
| 4,545,951 | A | * | 10/1985 | Gordon ........................ 264/322 |
| 5,582,842 | A | * | 12/1996 | Wise et al. .................... 425/393 |
| 5,785,906 | A | * | 7/1998 | Prenger et al. ................ 425/140 |
| 5,863,569 | A | * | 1/1999 | Leopoldo et al. .......... 425/387.1 |

FOREIGN PATENT DOCUMENTS

| BE | 338347 | 1/1927 |
| EP | 0 284 773 | 10/1988 |
| GB | 2356598 | 5/2001 |
| JP | 02130127 | 5/1990 |

\* cited by examiner

*Primary Examiner* — Richard Crispino
*Assistant Examiner* — Thukhanh Nguyen
(74) *Attorney, Agent, or Firm* — King & Schickli, PLLC

(57) ABSTRACT

A device for the preparation of pipe ends, prior to jointing them together using an inserted close-fitting spool and an external close-fitting sleeve, consists of a plain cylindrical mandrel (10) adapted to be firmly fixed centrally inboard of an end zone of the bore of a pipe (12) so as to project from the end of the pipe, a hydraulic cylinder (46) adapted to be removeably mounted co-axially on the projecting end of the mandrel, and a piston (48) in the cylinder slideable along the mandrel and adapted to carry an interchangeable annular tool, whereby the tool can be force fed axially along the mandrel into the pipe to modify the bore thereof.

4 Claims, 7 Drawing Sheets

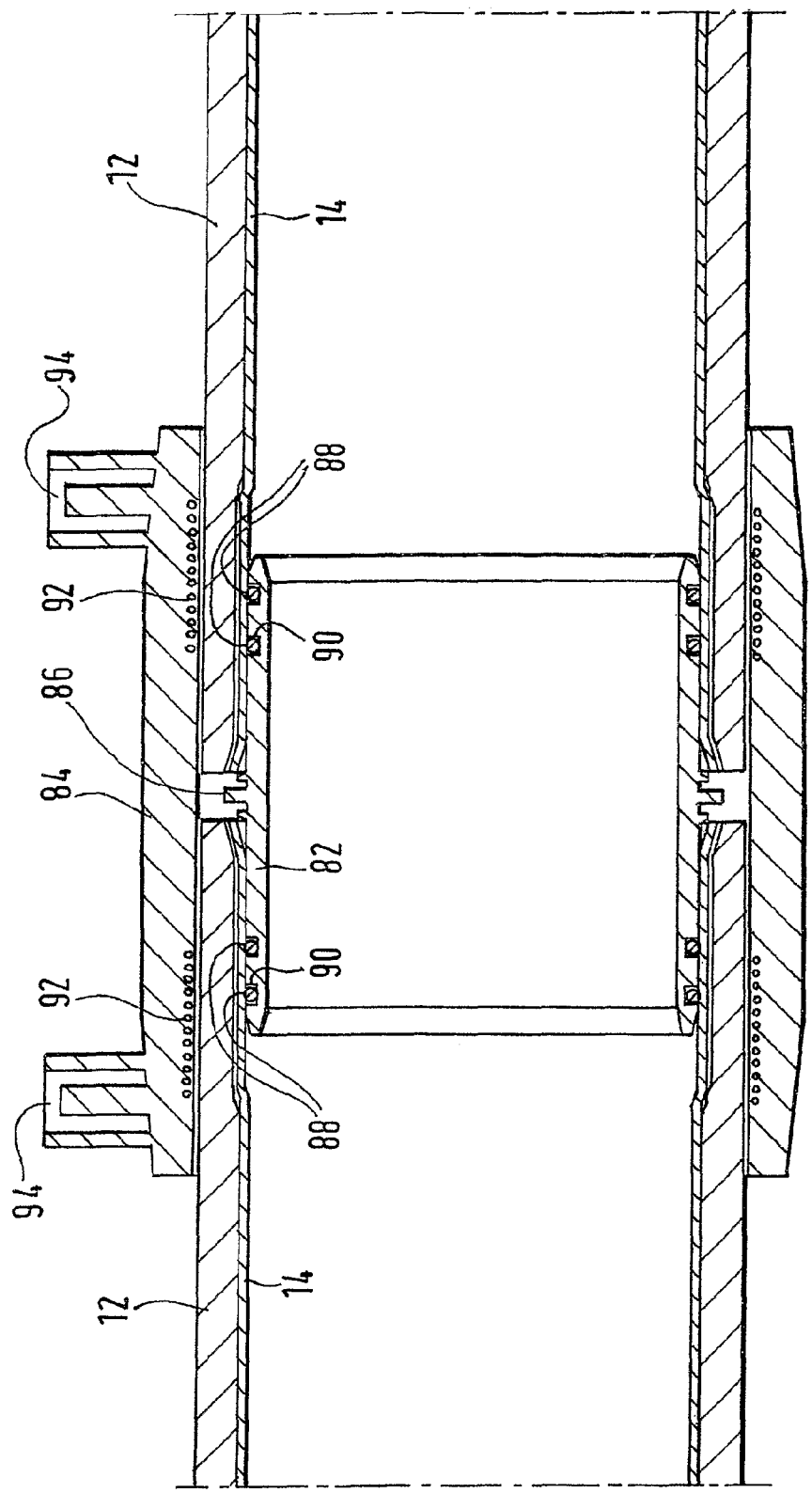

DEVICE FOR PREPARING PIPE ENDS FOR JOINTING

FIELD OF THE INVENTION

This invention relates to a device for the preparation of pipe ends prior to jointing them together using an internal close-fitting spool and an external close-fitting sleeve.

BACKGROUND OF THE INVENTION

The pipes concerned are plastics pipes now being introduced in preference to metal pipes, for reasons of corrosion resistance and relative ease of jointing, for the transportation of liquid or gaseous fluids, for example petrol or drinking water. However, plain plastics pipes can allow substances in the pipe material itself or from outside the pipes to percolate into and contaminate the fluids, or conversely allow the fluids to percolate to the outside and pollute the environment. To prevent any such percolation, plastics pipes are being provided with thin metallic liners, but these complicate their jointing together.

SUMMARY OF THE INVENTION

Our U.K. Patent No. 2356598 discloses a device for slightly flaring and then accurately expanding the pipe ends to facilitate jointing them together using an internal close-fitting metallic spool inserted into both ends to be joined. The joint can then be completed by means of an external close-fitting plastics sleeve sealed around the pipe ends by electrical heating means in known manner. Our patented device is manually operated and includes a feed nut rotateable by a cranked handle on an externally screw-threaded tube firmly fixed centrally in the bore of a pipe so as to force feed an interchangeable tool carried by the nut axially into the pipe end. This arrangement has been found to have the disadvantages that particles of the sand in which the pipes are usually bedded on site often find their way on to the screw thread and seriously impede rotation of the nut, that the manual procedure is slow, and that it is quite arduous.

The object of the present invention is to provide an improved device which avoids these disadvantages.

A further object is to enable the improved device to also prepare the pipe ends for fitting of the external sleeve.

According to the invention, a device for the preparation of pipe ends, prior to jointing them together using an inserted close-fitting spool and an external close-fitting sleeve, comprises a plain cylindrical mandrel adapted to be firmly fixed centrally inboard of an end zone of the bore of a pipe so as to project from the end of the pipe, a hydraulic cylinder adapted to be removeably mounted co-axially on the projecting end of the mandrel, and a piston in the cylinder slideable along the mandrel and adapted to carry an interchangeable annular tool, whereby the tool can be force fed axially along the mandrel into the pipe to modify the bore thereof.

Preferably, the mandrel is fixed in the bore by expandable collet means mounted on the mandrel.

Preferably, also, the collet means are expandable by manual rotation of a screw-threaded rod passing co-axially through the mandrel.

The collet means and the tool are preferably available in different sizes to suit different pipe bore sizes.

Preferably, the hydraulic cylinder is mounted on the mandrel by quick-release means.

Preferably, also, the tool is interchangeably carried on the piston by quick-release means.

The interchangeable tool may be a forming tool for initially flaring the end of the pipe.

Preferably, said forming tool is of conical shape.

Alternatively, the interchangeable tool is a calibration tool employed subsequently to flaring for expanding an end zone of the pipe to an inside diameter consistent with the spool.

Preferably, said calibration tool is of part-spherical shape.

The device preferably comprises also an externally screw-threaded tube adapted to be mounted co-axially and non-rotateably on the mandrel in place of the hydraulic cylinder, and a carrier with a mating screw-threaded bore which is rotateable along the tube so as to travel axially relative to the mandrel to enable at least one cutting edge on the carrier to reduce a zone of the outside diameter of the pipe to a diameter consistent with the bore of the sleeve.

Preferably, the carrier has three equally circumferentially-spaced longitudinally-extending arms each of which is provided with a cutting edge.

Preferably, also, the or each cutting edge is on a replaceable insert.

DESCRIPTION OF THE DRAWING FIGURES

The carrier is preferably available in different sizes to suit pipes of different outside diameters.

A preferred embodiment of the invention will now be described, by way of example, with reference to the accompanying drawings, of which:—

FIG. 7 is a sectional side elevation of pipe ends prepared by the device and jointed together by an internal spool and an external sleeve.

DETAILED DESCRIPTION OF THE INVENTION

Figure 1:
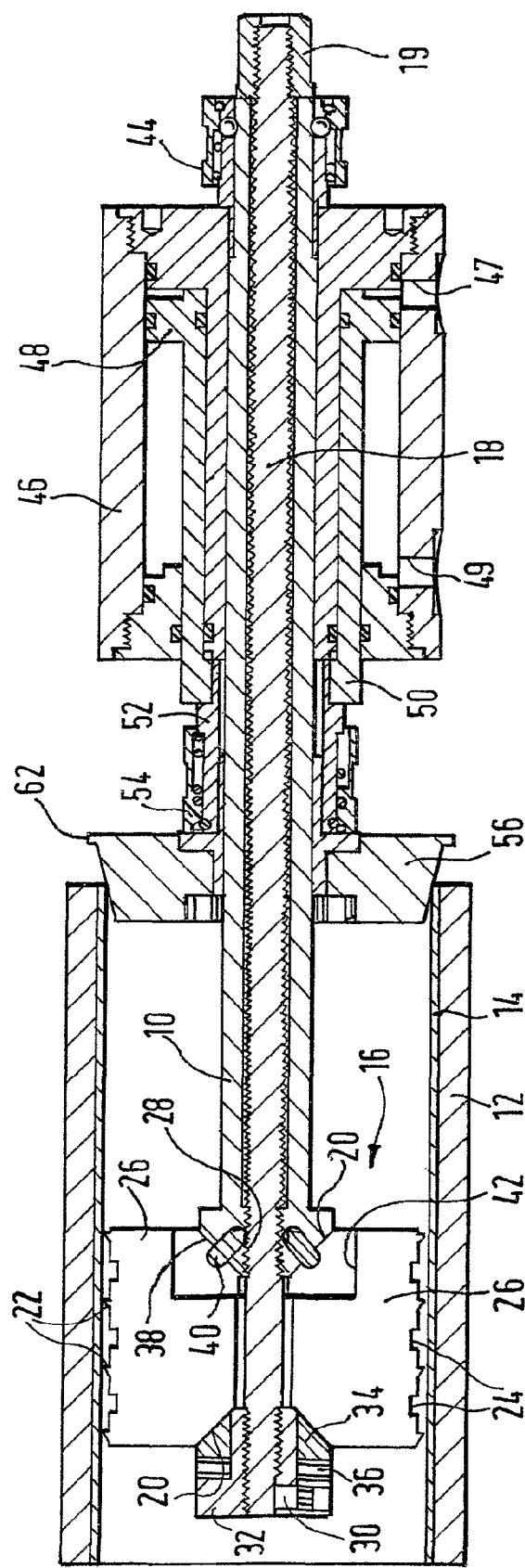
FIG. 1 is a sectional side elevation of a device for the preparation of pipe ends prior to jointing them together using an internal close-fitting spool, the device being shown inserted but not yet fixed in the end of a pipe and carrying a conical tool in position to be force fed hydraulically into the pipe.
Figure 2:
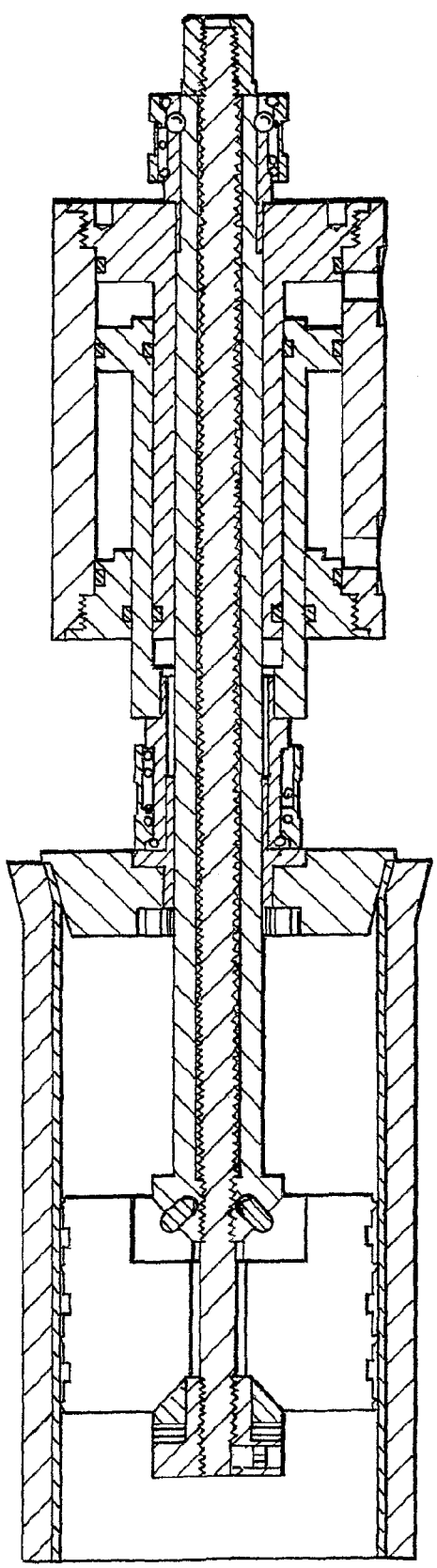
FIG. 2 is a similar view of the device firmly fixed centrally in the pipe with said tool then having been force fed to slightly flare the pipe end.
Figure 3:
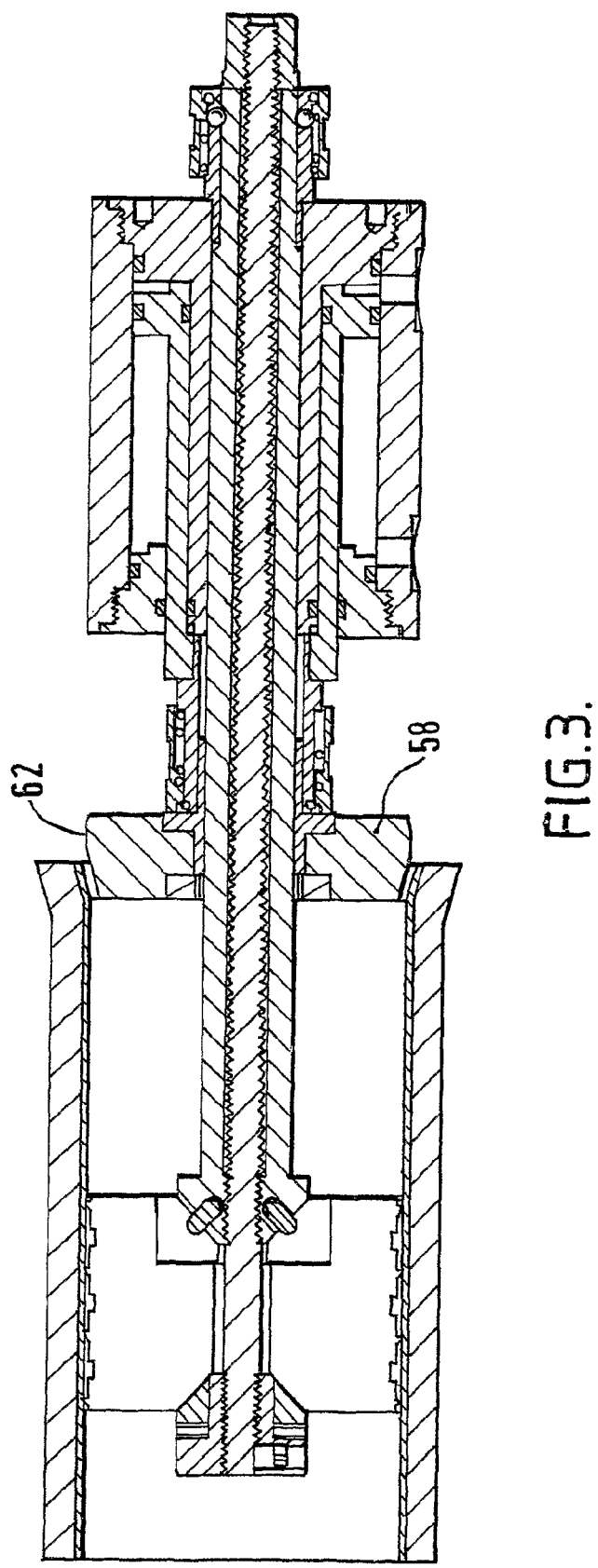
FIG. 3 is a similar view of the device fixed in the pipe and now carrying a part-spherical calibration tool positioned ready to be force fed hydraulically into the pipe.
Figure 4:
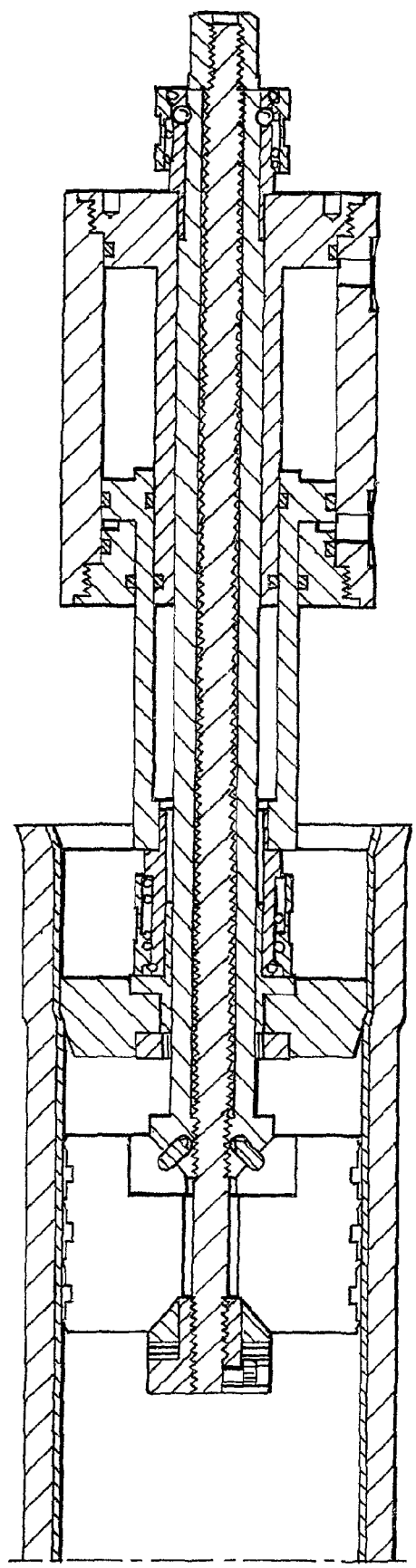
FIG. 4 is a similar view of the device fixed in the pipe with said tool having been force fed to accurately expand an end zone of the pipe.

Referring now to FIGS. 1 to 4 of the drawings, wherein common components are only numbered for convenience in FIG. 1, a device for the preparation of pipe ends, prior to jointing them together using an internal close-fitting spool, includes a plain cylindrical mandrel 10 adapted to be firmly fixed centrally inboard of an end zone of a pipe so as to project from the end thereof, the pipe being principally of plastics material 12 with a thin metallic liner 14. The mandrel 10 is fixed in the bore by collet means indicated generally at 16 which are expandable by the rotation of a screw-threaded rod 18 passing co-axially through the mandrel 10 and having an hexagonal nut 19 secured on its end remote from the collet means 16. The collet means 16 consist of a cylindrical assembly having tapered inner end surfaces 20, sharp peripheral annular projections 22, and peripheral annular grooves 24. Said assembly is split diametrically in six equal sectors 26 retained together and urged radially inwards by resilient O-rings (not shown) accommodated in the grooves 24. The rod 18 engages a screw-threaded zone 28 within the mandrel 10, passes co-axially through the collet means 16, and has fixed by a grub-screw 30 at its end remote from the mandrel a nut 32. A non-rotateable cone 34 mounted on said nut by means of an interposed thrust bearing 36 engages the surfaces 20 at the adjacent end of said means. That end of the mandrel 10 adjacent the collet means 16 has a conical surface 38 which engages the surfaces 20 at the other end of said means, and pins 40 projecting from the surface 38 engage in slots 42 in the surfaces 20 to hold the collet sectors 26 against rotation. Removeably mounted co-axially and non-rotateably by means of a quick-release coupling 44 on that portion of the mandrel 10 which projects from the bore of the pipe 12, 14 is a double-acting hydraulic cylinder 46 with alternative pressure supply ports 47 and 49. Slideable in said cylinder is a piston 48 with a tubular piston rod 50 which extends from the cylinder 46 towards the collet means 16 and has fixed to it an extension 52. Said extension is adapted to carry by means of a quick-release coupling 54 an interchangeable annular tool illustrated in FIGS. 1 and 2 as a conical forming tool 56 for initially flaring the end of the pipe as shown in FIG. 2, and illustrated in FIGS. 3 and 4 as a calibration tool 58 with a part-spherical surface 60 employed subsequently to flaring for expanding an end zone of the pipe as shown in FIG. 4 to an inside diameter consistent with the spool. The tool 56 has an end flange 62 to limit its flaring action as shown in FIG. 2.

Figure 5:
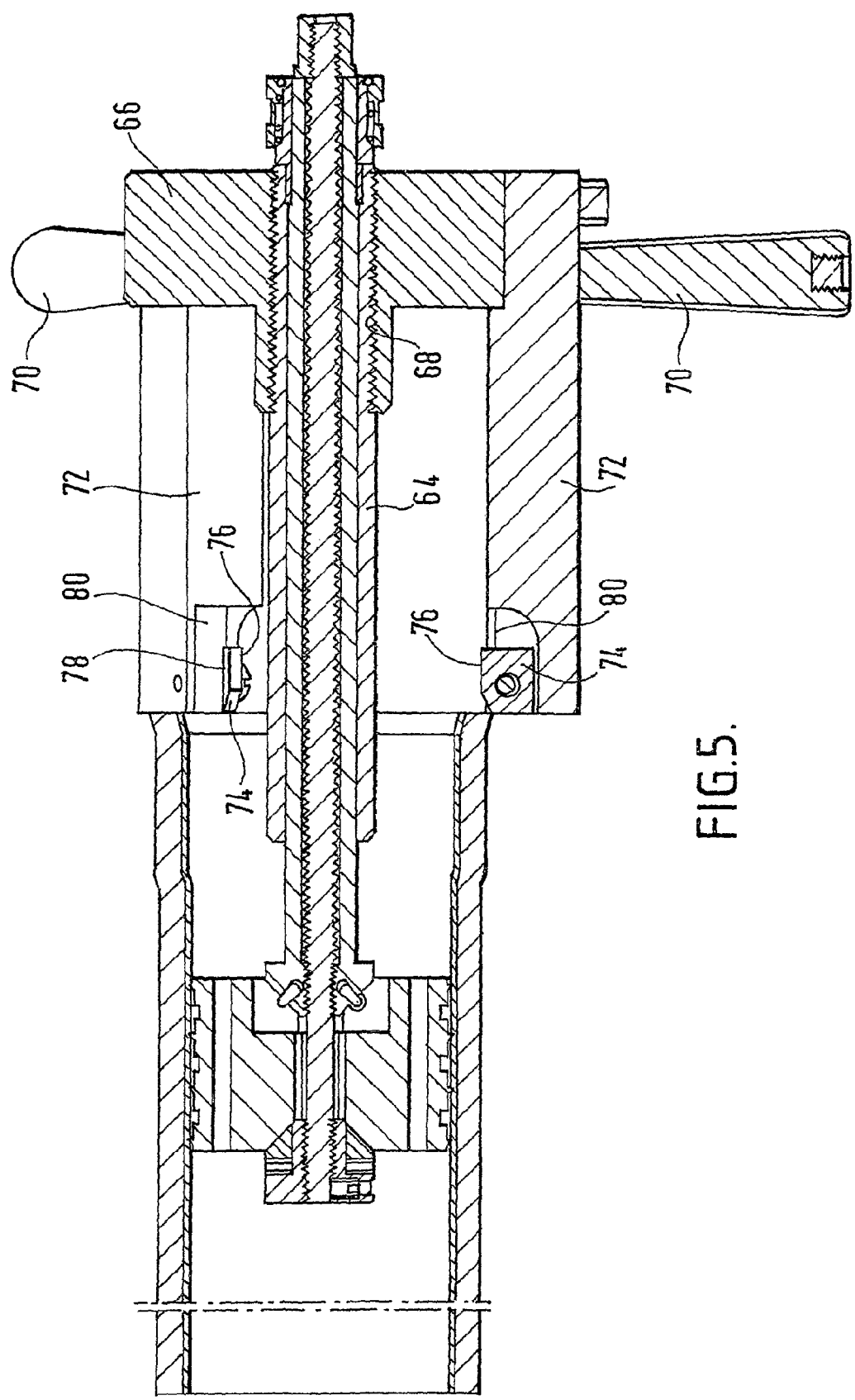
FIG. 5 is a similar view of the device fixed in the pipe and now fitted with a manually rotateable screw-fed carrier having cutting inserts positioned ready to slightly reduce the outside diameter of the pipe end.
Figure 6:
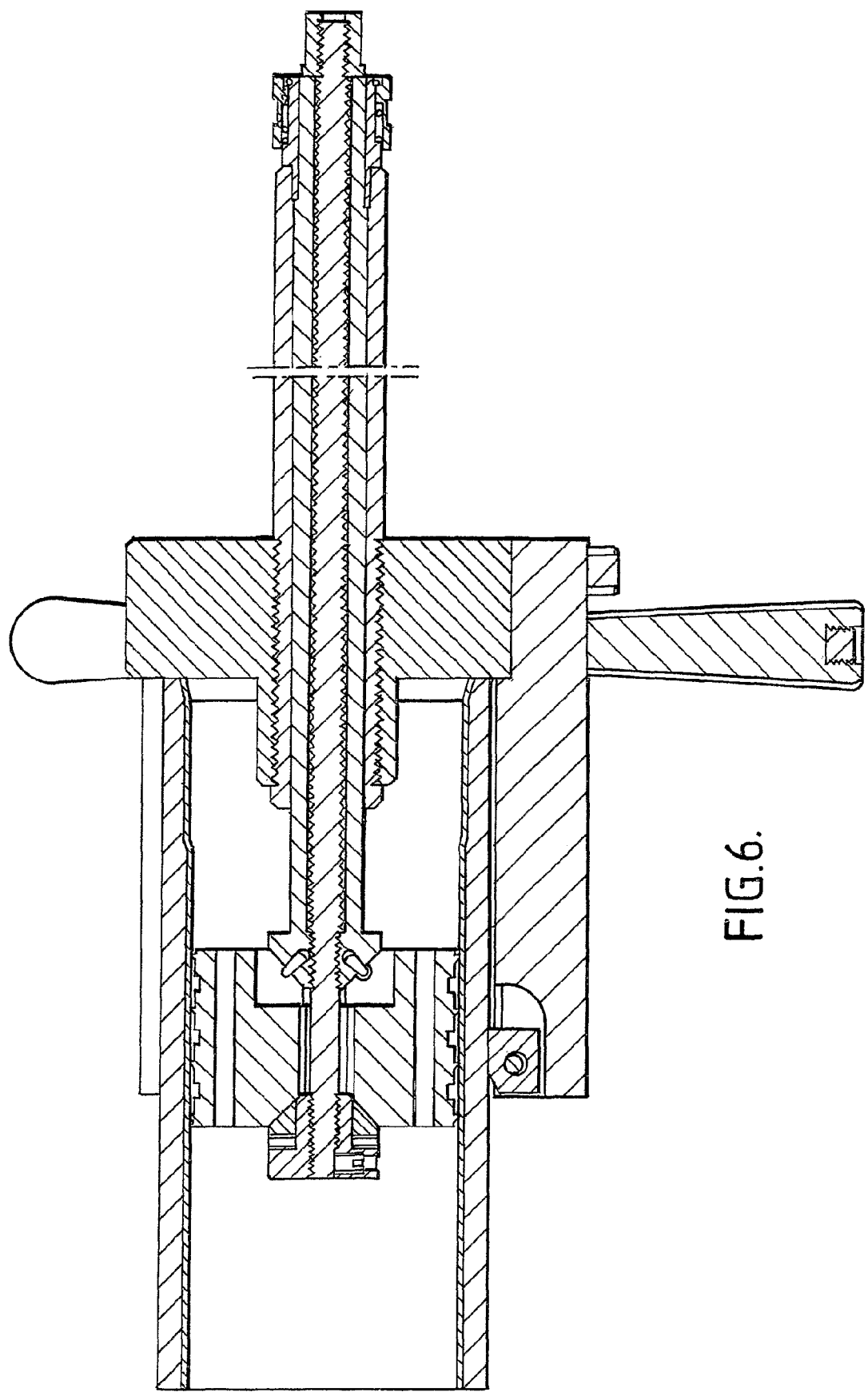
FIG. 6 is a similar view of the device fixed in the pipe with said diameter having been reduced by said inserts.

In FIG. 5 of the drawings, common components are again only numbered for convenience in FIG. 1, while FIG. 6, having identical components to FIG. 5, is numbered. Referring now to FIGS. 5 and 6, an externally screw-threaded tube 64 is adapted to be mounted co-axially and non-rotateably by means of the quick-release coupling 44 on the mandrel 10 in place of the hydraulic cylinder 46, its piston 48 and the tool 58. A carrier 66 with a mating screw-threaded bore 68 is rotateable manually along the tube 64 by means of three equally circumferentially-spaced handles 70, and is provided with three equally circumferentially-spaced longitudinally-extending arms 72 each of which is provided with a replaceable hardened steel insert 74 having a cutting edge 76 and a lip 78 which locates it accurately in radial position against a shoulder 80 formed on the associated arm 72. It will be appreciated any number of handles can be provided and the carrier 66 can be rotateable along the tube 64 by power-operated means such as electrically or hydraulically operated means.

In operation, as already intimated and prior to insertion of the device into the pipe, a flaring tool 56 is coupled to the piston rod extension 52 and a sub-assembly comprising the hydraulic cylinder 46 with its piston 48 and the tool 56 is mounted co-axially on the mandrel 10. The complete device is then inserted into the pipe until the tool 56 contacts the bore thereof as shown in FIG. 1. The screw-threaded rod 18 is then manually rotated by means of a spanner applied to the nut 19, whilst the operator manually holds the hydraulic cylinder 46 and thus the mandrel 10 against rotation, in a rotational sense to cause said rod, the nut 32 and the cone 34 to be drawn towards the cone 38 on the mandrel in order to expand the collet means 16 and cause their projections 22 to grip the bore of the pipe firmly as shown in FIGS. 2 to 4. Oil under pressure is then supplied to the hydraulic cylinder 46 via the port 47 from a suitable pump to urge the piston 48 towards the pipe in order to force feed the tool 56 into the bore of the pipe to flare it as shown in FIG. 2, after which the tool is hydraulically withdrawn by switching the supply of oil under pressure to the port 49.

The afore-said sub-assembly is then uncoupled from the mandrel 10, which is left firmly fixed centrally in the bore of the pipe by the expanded collet means 16. The flaring tool 56 is uncoupled from the piston rod extension 52 and replaced by the calibration tool 58, and said sub-assembly is remounted on the mandrel 10 as shown in FIG. 3. The tool 58 is next hydraulically force fed into the bore to slightly and accurately expand an end zone thereof as shown in FIG. 4 by a full stroke of the piston 48, and then withdrawn. Said end zone is at least equal in length to half the full length of the spool to be fitted therein.

The afore-said sub-assembly is then again uncoupled from the mandrel 10, which is once more left firmly fixed centrally in the bore of the pipe by the expanded collet means 16, and the tube 64 and the associated carrier 66 are mounted on the mandrel 10 by means of the quick-release coupling 44 as shown in FIG. 5. The carrier 66 is then rotated manually along the tube 64 by means of the handles 70 so as to travel axially relative to the mandrel 10 by virtue of the screw-threaded connection between the tube 64 and the carrier 66. The enables the inserts 74 to function as turning tools and reduce a zone of the outside diameter of the pipe to a diameter consistent with the bore of the sleeve to be sealed thereon, whilst also providing a clean surface to ensure effective sealing. Said zone extends along the pipe for a distance at least equal to the full length of the sleeve, so that during assembly of the joint between two pipe ends the sleeve can first be slid fully along one of said ends without risk of contaminating its bore with dirt, oil or the like, and subsequently slid back to its operative position equally bridging the pipe ends when the joint is ready for sealing. Finally the nut 19 is rotated to allow the collet means 16 to contract whereupon the whole device is removed from the bore of the pipe.

By virtue of the use of the mandrel 10 which remains firmly fixed centrally in the bore of the pipe throughout pipe end preparation, the device facilitates the jointing together of pipe ends in known manner as shown in FIG. 7. In said figure two pipes principally of plastics material 12 with a thin metallic liner 14 which have been prepared using our device as hereinbefore described are jointed together by an internal close-fitting metallic spool 82 and an external close-fitting plastics sleeve 84. The spool 82 has a flange 86 at the mid-point of its length, and O-rings 88 in a pair of peripheral grooves 90 near each of its ends which seal against the expanded metallic liner 14 of one of the pipe ends. The sleeve 84 has moulded into its bore windings of resistance wire 92 through which an electrical current can be passed by way of sockets 94 in order to melt said bore and the adjacent reduced diameter zones of the pipe ends so that they coalesce in order to seal the joint when the current is cut off.

The collet means 16 and the interchangeable tools 56, 58 are available in different sizes to suit different pipe bore sizes, and the carrier 66 is available in different sizes to suit pipes of different outside diameters.

The entire procedure can be effected on site in a smooth, fast and non-arduous manner.

The invention claimed is:

1. A device for the preparation of pipe ends, prior to jointing them together using an inserted close-fitting spool and an external close-fitting sleeve, comprising:
a plain cylindrical mandrel adapted to be firmly fixed centrally inboard of an end zone of the bore of a pipe so as to project from the end of the pipe,
a hydraulic cylinder adapted to be removeably mounted co-axially on the projecting end of the mandrel, and a piston in the cylinder slideable along the mandrel and adapted to carry an interchangeable annular tool, whereby the tool can be force fed axially along the mandrel into the pipe to modify the bore thereof; and
an externally screw-threaded tube adapted to be mounted coaxially and non-rotateably on the mandrel in place of the hydraulic cylinder, and a carrier with a mating screw-threaded bore which is rotatable along the tube so as to travel axially relative to the mandrel to enable at least one cutting edge on the carrier to reduce a zone of the outside diameter of the pipe to a diameter consistent with the bore of the sleeve.

2. A device according to claim 1, wherein the carrier has three equally circumferentially-spaced longitudinally-extending arms each or which is provided with a cutting edge.

3. A device according to claim 1, wherein the or each cutting edge is on a replaceable insert.

4. A device according to claim 1, wherein the carrier is available in different sizes to suit pipes of different outside diameters.

* * * * *